US012598302B2

(12) United States Patent
Zhao et al.

(10) Patent No.: US 12,598,302 B2
(45) Date of Patent: Apr. 7, 2026

(54) IMAGE DECODING METHOD AND DEVICE FOR CODING CHROMA QUANTIZATION PARAMETER OFFSET-RELATED INFORMATION

(71) Applicant: LG Electronics Inc., Seoul (KR)

(72) Inventors: Jie Zhao, Seoul (KR); Seunghwan Kim, Seoul (KR); Seethal Paluri, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/791,990

(22) Filed: Aug. 1, 2024

(65) Prior Publication Data

US 2024/0397048 A1      Nov. 28, 2024

Related U.S. Application Data

(63) Continuation of application No. 17/629,651, filed as application No. PCT/KR2020/011084 on Aug. 20, 2020, now Pat. No. 12,088,806.

(60) Provisional application No. 62/890,603, filed on Aug. 22, 2019.

(51) Int. Cl.
| | |
|---|---|
| *H04N 19/18* | (2014.01) |
| *H04N 19/124* | (2014.01) |
| *H04N 19/132* | (2014.01) |
| *H04N 19/169* | (2014.01) |
| *H04N 19/176* | (2014.01) |
| *H04N 19/186* | (2014.01) |
| *H04N 19/60* | (2014.01) |
| *H04N 19/70* | (2014.01) |

(52) U.S. Cl.
CPC ......... *H04N 19/124* (2014.11); *H04N 19/132* (2014.11); *H04N 19/176* (2014.11); *H04N 19/18* (2014.11); *H04N 19/186* (2014.11); *H04N 19/1883* (2014.11); *H04N 19/60* (2014.11); *H04N 19/70* (2014.11)

(58) Field of Classification Search
CPC .. H04N 19/124; H04N 19/132; H04N 19/176; H04N 19/18; H04N 19/186; H04N 19/1883; H04N 19/60; H04N 19/70
USPC ...................................... 375/240.03
See application file for complete search history.

(56) References Cited

U.S. PATENT DOCUMENTS

2015/0016542 A1*   1/2015 Rosewarne .......... H04N 19/126
                                                            375/240.25

* cited by examiner

*Primary Examiner* — Nguyen T Truong
(74) *Attorney, Agent, or Firm* — Fish & Richardson P.C.

(57)                ABSTRACT

An image decoding method performed by a decoding device according to the present document comprises the steps of: obtaining CU chroma QP offset-related information for a current chroma block on the basis of the size and tree type of the current chroma block; deriving a chroma QP for the current chroma block on the basis of the CU chroma QP offset-related information; deriving residual samples for the current chroma block on the basis of the chroma QP; and generating a reconstructed picture on the basis of the residual samples, wherein the CU chroma QP offset-related information includes a CU chroma QP offset flag and a CU chroma QP offset index for the current chroma block.

3 Claims, 12 Drawing Sheets

FIG. 2

128x128 CU cu_qp_delta sent in this TU
applies to all TUs this CU

| | | |
|---|---|---|
| 27 | 27 | 35 |
| 38 | 38 | 27 |
| | 27 | 27 |

(a) Luma QP map

| | | |
|---|---|---|
| 29 | 29 | 37 |
| 40 | 40 | 29 |
| | 29 | 29 |

(b) Chroma QP map (a) Chroma QP map
(CuQpOffset $_{chroma}$ =-9)

(b) Chroma QP map
(CuQpOffset $_{chroma}$ =2)

IMAGE DECODING METHOD AND DEVICE FOR CODING CHROMA QUANTIZATION PARAMETER OFFSET-RELATED INFORMATION

CROSS-REFERENCE TO RELATED APPLICATIONS

This application is a continuation of U.S. application Ser. No. 17/629,651, filed on Jan. 24, 2022, which is a National Stage application under 35 U.S.C. § 371 of International Application No. PCT/KR2020/011084, filed on Aug. 20, 2020, which claims the benefit of U.S. Provisional Application No. 62/890,603, filed on Aug. 22, 2019. The disclosures of the prior applications are incorporated by reference in their entirety.

BACKGROUND OF DISCLOSURE

Field of the Disclosure

This document relates to image coding technology, and more particularly, to an image decoding method for coding CU level chroma quantization parameter offset related information in an image coding system, and an apparatus for the image decoding method.

Related Art

Recently, demand for high-resolution, high-quality images, such as High Definition (HD) images and Ultra High Definition (UHD) images, has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high-resolution and high-quality images.

SUMMARY

A technical object of the present disclosure is to provide a method and apparatus for improving image coding efficiency.

Another technical object of the present disclosure is to provide a method and apparatus for increasing data coding efficiency of deriving a quantization parameter for a chroma component.

According to an embodiment of this document, an image decoding method performed by a decoding apparatus is provided. The method includes obtaining Coding Unit (CU) chroma Quantization Parameter (QP) offset related information for a current chroma block based on a tree type and a size of the current chroma block, deriving a chroma QP for the current chroma block based on the CU chroma QP offset related information, deriving residual samples for the current chroma block based on the chroma QP and generating a reconstructed picture based on the residual samples, wherein the CU chroma QP offset related information includes a CU chroma QP offset flag and a CU chroma QP offset index for the current chroma block.

According to another embodiment of this document, a decoding apparatus for performing image decoding is provided. The decoding apparatus includes an entropy decoder configured to obtain Coding Unit (CU) chroma Quantization Parameter (QP) offset related information for a current chroma block based on a tree type and a size of the current chroma block, a residual processor configured to derive a chroma QP for the current chroma block based on the CU chroma QP offset related information, and derive residual samples for the current chroma block based on the chroma QP, and an adder configured to generate a reconstructed picture based on the residual samples, wherein the CU chroma QP offset related information includes a CU chroma QP offset flag and a CU chroma QP offset index for the current chroma block.

According to still another embodiment of this document, a video encoding method which is performed by an encoding apparatus is provided. The method includes generating Coding Unit (CU) chroma Quantization Parameter (QP) offset related information for a current chroma block based on a tree type and a size of the current chroma block and encoding image information including the CU chroma QP offset related information, wherein the CU chroma QP offset related information includes a CU chroma QP offset flag and a CU chroma QP offset index for the current chroma block.

According to still another embodiment of this document, a video encoding apparatus is provided. The encoding apparatus includes an entropy encoder configured to generate Coding Unit (CU) chroma Quantization Parameter (QP) offset related information for a current chroma block based on a tree type and a size of the current chroma block, and encode image information including the CU chroma QP offset related information, wherein the CU chroma QP offset related information includes a CU chroma QP offset flag and a CU chroma QP offset index for the current chroma block.

According to still another embodiment of this document, there is provided a computer-readable digital storage medium which stores a bitstream including image information that causes a decoding apparatus to perform an image decoding method. In the computer-readable storage medium, the image decoding method includes obtaining Coding Unit (CU) chroma Quantization Parameter (QP) offset related information for a current chroma block based on a tree type and a size of the current chroma block, deriving a chroma QP for the current chroma block based on the CU chroma QP offset related information, deriving residual samples for the current chroma block based on the chroma QP and generating a reconstructed picture based on the residual samples, wherein the CU chroma QP offset related information includes a CU chroma QP offset flag and a CU chroma QP offset index for the current chroma block.

According to this document, even if the first transform block in the current chroma block does not include a non-zero transform coefficient level, and when at least one of the width and height of the current chroma block is greater than a specific size, information on the CU chroma QP offset can be signaled, and, thereby, it is possible to reduce the cost of configuring the decoding apparatus.

According to this document, even if the first transform block in the current chroma block does not include a non-zero transform coefficient level, information about the CU chroma QP offset may be signaled in the transform unit syntax of the first transform block based on the size and tree type of the current chroma block, and, thereby, it is possible to reduce the buffer requirement of the decoding apparatus and to reduce the cost of configuring the decoding apparatus.

BRIEF DESCRIPTION OF THE DRAWINGS

FIG. 2 is a schematic diagram illustrating a configuration of a video/image encoding apparatus to which the embodiment(s) of the present disclosure may be applied.

DESCRIPTION OF EMBODIMENTS

Figure 1:
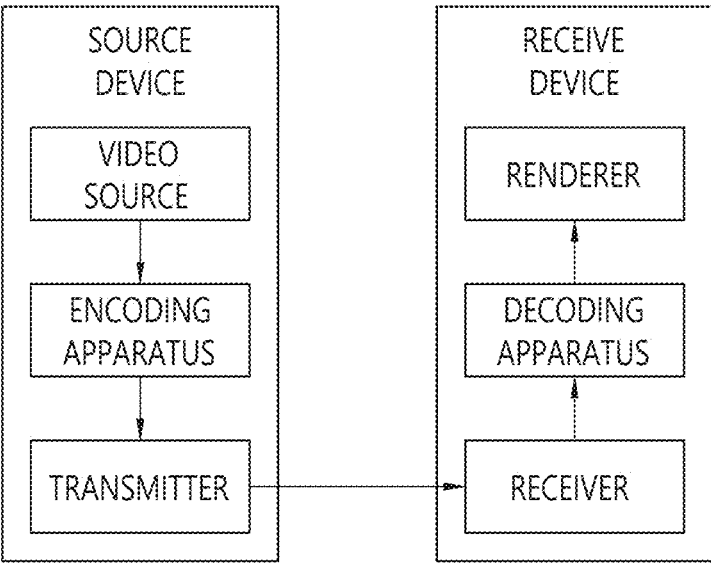
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. In addition, a subpicture may represent a rectangular region of one or more slices within a picture. That is, a subpicture contains one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present description, "A or B" may mean "only A", "only B" or "both A and B". In other words, in the present specification, "A or B" may be interpreted as "A and/or B". For example, "A, B or C" herein means "only A", "only B", "only C", or "any and any combination of A, B and C".

A slash (/) or a comma (comma) used in the present description may mean "and/or". For example, "A/B" may mean "A and/or B". Accordingly, "A/B" may mean "only A", "only B", or "both A and B". For example, "A, B, C" may mean "A, B, or C".

In the present description, "at least one of A and B" may mean "only A", "only B", or "both A and B". In addition, in the present description, the expression "at least one of A or B" or "at least one of A and/or B" may be interpreted the same as "at least one of A and B".

In addition, in the present description, "at least one of A, B and C" means "only A", "only B", "only C", or "any combination of A, B and C". Also, "at least one of A, B or C" or "at least one of A, B and/or C" may mean "at least one of A, B and C".

In addition, parentheses used in the present description may mean "for example". Specifically, when "prediction (intra prediction)" is indicated, "intra prediction" may be proposed as an example of "prediction". In other words, "prediction" in the present description is not limited to "intra prediction", and "intra prediction" may be proposed as an example of "prediction". Also, even when "prediction (i.e., intra prediction)" is indicated, "intra prediction" may be proposed as an example of "prediction".

In the present description, technical features that are individually described within one drawing may be implemented individually or may be implemented at the same time.

The following drawings were created to explain a specific example of the present description. Since the names of specific devices described in the drawings or the names of specific signals/messages/fields are presented by way of example, the technical features of the present description are not limited to the specific names used in the following drawings.

Figure 2:
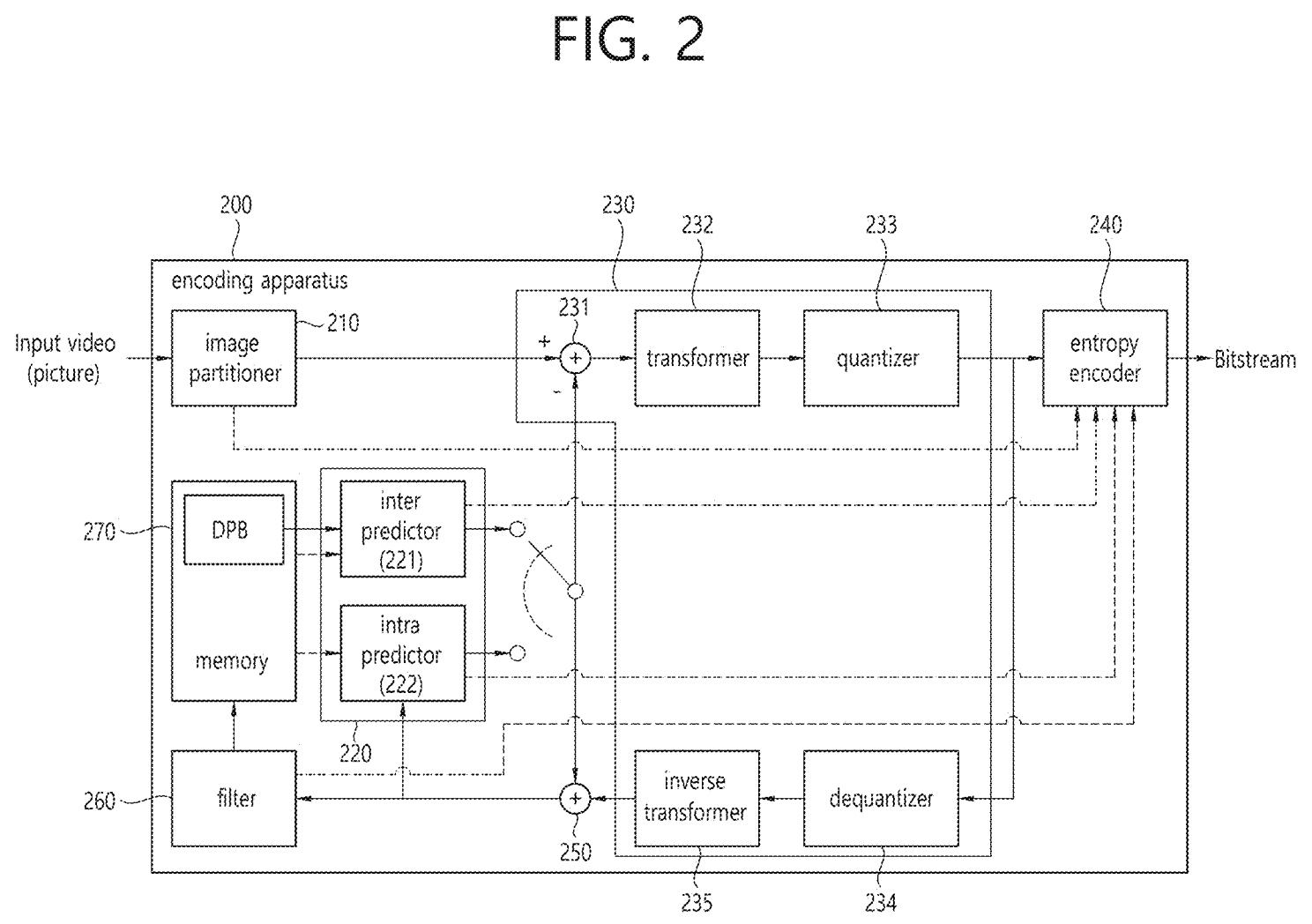

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
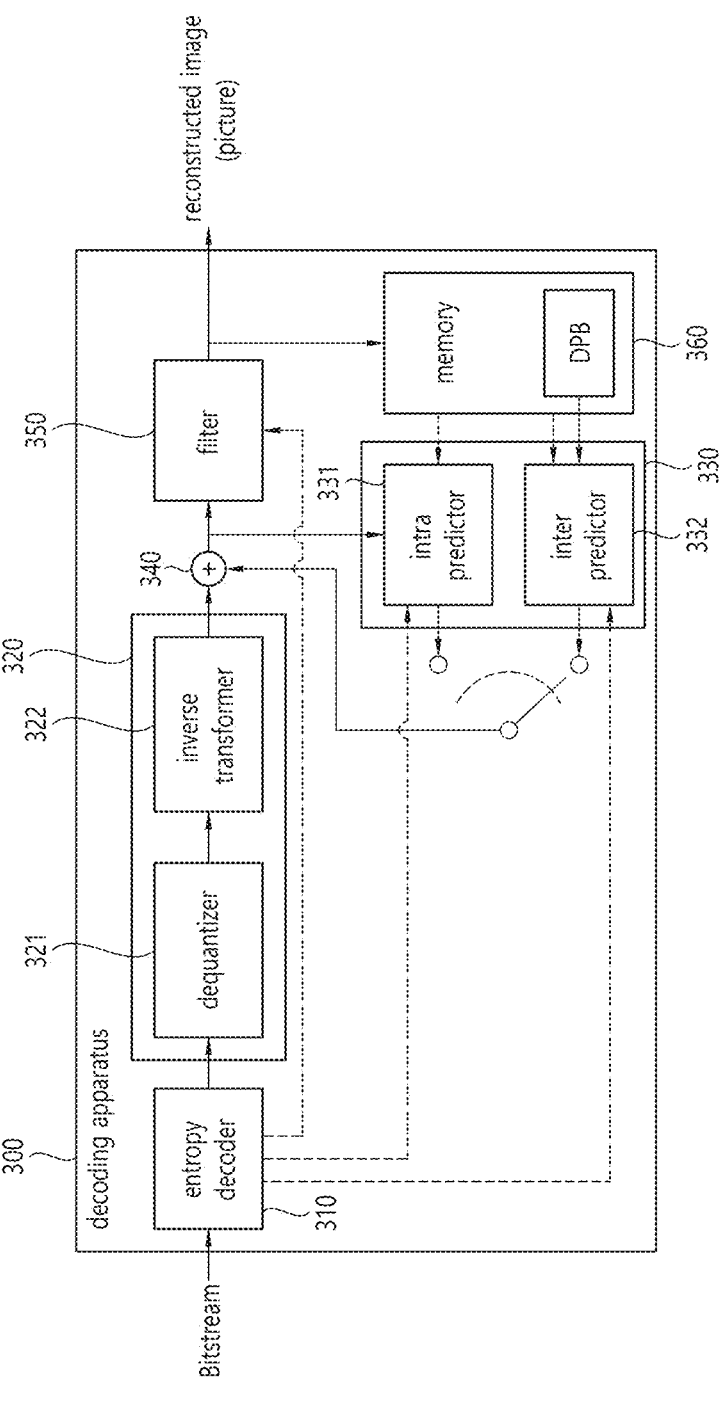
FIG. 3 is a schematic diagram illustrating a configuration of a video/image decoding apparatus to which the embodiment(s) of the present disclosure may be applied.
Figure 4:
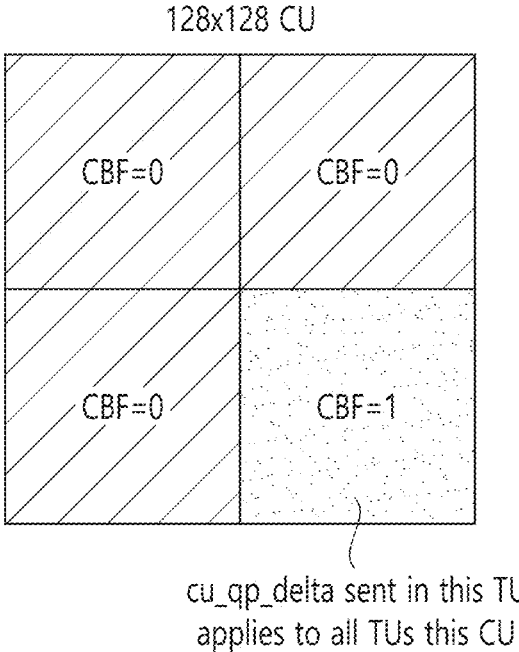
FIG. 4 shows an example in which cu_qp_delta for TUs within a CU having a size of 128×128 are transmitted.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

In the present disclosure, at least one of quantization/inverse quantization and/or transform/inverse transform may be omitted. When the quantization/inverse quantization is omitted, the quantized transform coefficients may be called transform coefficients. When the transform/inverse transform is omitted, the transform coefficients may be called coefficients or residual coefficients, or may still be called transform coefficients for uniformity of expression.

In the present disclosure, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or the information on the transform coefficient(s)), and scaled transform coefficients may be derived by inverse transforming (scaling) on the transform coefficients. Residual samples may be derived based on the inverse transforming (transforming) on the scaled transform coefficients. This may be applied/expressed in other parts of the present disclosure as well.

Meanwhile, as described above, the quantizer of the encoding apparatus may derive quantized transform coefficients by applying quantization to transform coefficients. The dequantizer of the encoding apparatus or the dequantizer of the decoding apparatus may derive transform coefficients by applying dequantization to the quantized transform coefficients.

In general, in video/image coding, a quantization ratio may be changed, and a compression rate may be adjusted using the changed quantization ratio. In an implementation aspect, a quantization parameter (QP) may be used instead of directly using the quantization ratio by considering complexity. For example, quantization parameters having integer values of 0 to 63 may be used, and each quantization parameter value may correspond to an actual quantization ratio. Furthermore, for example, a quantization parameter $QP_Y$ for a luma component and a quantization parameter $QP_C$ for a chroma component may be different configured.

In a quantization process, a transform coefficient C may be an input, a quantization ratio ($Q_{step}$) may be divided, and a quantized transform coefficient C' may be obtained based on the quantization ratio. In this case, the quantization ratio may be produced in an integer form by multiplying the quantization ratio by a scale by considering calculation complexity, and a shift operation may be performed by a value corresponding to a scale value. A quantization scale may be derived based on the product of the quantization ratio and the scale value. That is, the quantization scale may be derived based on the QP. For example, the quantization scale may be applied to the transform coefficient C', and a quantized transform coefficient C' may be derived based on a result of the application.

A dequantization process is a reverse process of the quantization process. In this process, a quantized transform coefficient C' may be multiplied by a quantization ratio ($Q_{step}$), and a reconstructed transform coefficient C" may be obtained based on the result of the multiplication. In this case, a level scale may be derived based on a quantization parameter, the level scale may be applied to the quantized transform coefficient C', and a reconstructed transform coefficient C" may be derived. The reconstructed transform coefficient C" may have some difference from the first transform coefficient C due to a loss in the transform and/or quantization process. Accordingly, dequantization is performed in the encoding apparatus as in the decoding apparatus.

Figure 5:
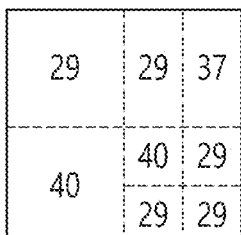
FIG. 5 represents an example of a QP map for a luma block and a chroma block when a single tree is used.

Meanwhile, an adaptive frequency weighting quantization technology for adjusting quantization strength depending on a frequency may be applied. The adaptive frequency weighting quantization technology is a method of differently applying quantization strength for each frequency. In the adaptive frequency weighting quantization, quantization strength for each frequency may be differently applied using a predefined quantization scaling matrix. That is, the aforementioned quantization/dequantization process may be performed based on the quantization scaling matrix. For example, in order to generate the size of a current block and/or a residual signal of the current block, a different quantization scaling matrix may be used depending on whether a prediction mode applied to the current block is inter prediction or intra prediction. The quantization scaling matrix may be called a quantization matrix or a scaling matrix. The quantization scaling matrix may be pre-defined. Furthermore, for frequency adaptive scaling, quantization scale information for each frequency for the quantization chroma QPs may be derived as the sum of the luma QP and the signaled chroma QP offset. Referring to FIG. 5, a rectangle represented by a solid line may indicate a quantization group, and a rectangle represented by a dotted line may indicate a CU. Also, for example, referring to FIG. 5, CuQpOffset$_{chroma}$ may be 2. Meanwhile, the tree type of the current block may be divided into a single tree (SINGLE_TREE) or a dual tree (DUAL_TREE) according to whether or not the current luma block and the corresponding current chroma blocks have their separate partition structures. For example, if the current chroma blocks have the same partition structure as the current luma block, it may be represented as a single tree, and if the current chroma blocks have a partition structure different from that of the current luma block, it may be represented as a dual tree. The current block may be a CU or TU.

Figure 6:
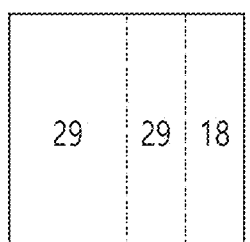
FIG. 6 represents an example of a QP map for a chroma block when a dual tree is used.
Figure 6:
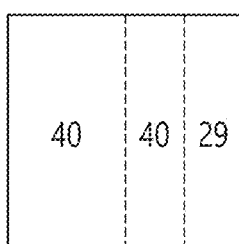

FIG. 6 represents an example of a QP map for a chroma block when a dual tree is used. Also, for example, referring to (a) of FIG. 6, CuQpOffset$_{chroma}$ may be −9, and referring to (b) of FIG. 6, CuQpOffset$_{chroma}$ may be 2. When a dual tree is used, a luma CU boundary and a chroma CU boundary may not be aligned. That is, the chroma blocks may have a different partition structure from that of the corresponding luma block. Therefore, for each chroma CU, the chroma QP may be derived as the sum of the co-located luma QP (to the center of the chroma CU) and the signaled chroma QP offset. The correlation between the luma QP and the chroma QP is somewhat maintained, but it may be difficult to predict the control over the chroma QP.

Additionally, in the VVC standard draft 6, the joint CbCr residual coding mode is integrated therein by extending the offset table from 2 QPoffsets per entry to 3 QPoffsets per entry.

Also, for example, the TU syntax of the VVC standard draft 6 may be as shown in the table below.

TABLE 2

| | Descriptor |
|---|---|
| transform_unit( x0, y0, tbWidth, tbHeight, treeType, subTuIndex, chType ) { | |
|   if( ( treeType = = SINGLE_TREE ‖ treeType = = DUAL_TREE_CHROMA ) && | |
|     ChromaArrayType != 0 ) { | |
|     if( ( IntraSubPartitionsSplitType = = ISP_NO_SPLIT && !( cu_sbt_flag & & | |
|       ( ( subTuIndex = = 0 && cu_sbt_pos flag ) ‖ | |
|        ( subTuIndex = = 1 && !cu_sbt_pos_flag ) ) ) ) ‖ | |
|       ( IntraSubPartitionsSplitType != ISP_NO_SPLIT && | |
|       ( subTuIndex = = NumIntraSubPartitions − 1 ) ) ) { | |
|       tu_cbf_cb[ x0 ][ y0 ] | ae(v) |
|       tu_cbf_cr[ x0 ][ y0 ] | ae(v) |
|     } | |
|   } | |
|   if( treeType = = SINGLE_TREE ‖ treeType = = DUAL_TREE_LUMA ) { | |
|     if( ( IntraSubPartitionsSplitType = = ISP_NO_SPLIT && !( cu_sbt_flag & & | |
|       ( ( subTuIndex = = 0 && cu_sbt_pos_flag ) ‖ | |
|       ( subTuIndex = = 1 && !cu_sbt_pos_flag ) ) ) && | |
|       ( CuPredMode[ chType ][ x0 ][ y0 ] = = MODE_INTRA ‖ | |
|         tu_cbf_cb[ x0 ][ y0 ] ‖ tu_cbf_cr[ x0 ][ y0 ] ‖ | |
|         CbWidth[ chType ][ x0 ][ y0 ] > MaxTbSizeY ‖ | |
|         CbHeight[ chType ][ x0 ][ y0 ] > MaxTbSizeY ) ) ‖ | |
|       ( IntraSubPartitionsSplitType != ISP_NO_SPLIT && | |
|       ( subTuIndex < NumIntraSubPartitions − 1 ‖ !InferTuCbfLuma ) ) ) | |
|       tu_cbf_luma[ x0 ][ y0 ] | ae(v) |
|     if(IntraSubPartitionsSplitType != ISP_NO_SPLIT ) | |
|       InferTuCbfLuma = InferTuCbfLuma && !tu_cbf_luma[ x0 ][ y0 ] | |
|   } | |
|   if( IntraSubPartitionsSplitType != ISP_NO_SPLIT && | |
|     treeType = = SINGLE_TREE && subTuIndex = = | |
| NumIntraSubPartitions − 1 ) ) | |
|     xC = CbPosX[ chType ][ x0 ][ y0 ] | |
|     yC = CbPosY[ chType ][ x0 ][ y0 ] | |
|     wC = CbWidth[ chType ][ x0 ][ y0 ] / SubWidthC | |
|     hC = CbHeight[ chType ][ x0 ][ y0 ] / SubHeightC | |
|   } else | |
|     xC = x0 | |
|     yC = y0 | |
|     wC = tbWidth / SubWidthC | |
|     hC = tbHeight / SubHeightC | |
|   } | |
|   if( ( CbWidth[ chType ][ x0 ][ y0 ] > 64 ‖ CbHeight[ chType ] | |
| [ x0 ][ y0 ] > 64 ‖ | |
|     tu_cbf_luma[ x0 ][ y0 ] ‖ tu_cbf_cb[ x0 ][ y0 ] ‖ tu_cbf_cr | |
| [ x0 ][ y0 ] ) && | |
|     treeType != DUAL_TREE_CHROMA ) { | |
|     if( cu_qp_delta_enabled_flag && !IsCuQpDeltaCoded ) { | |
|       cu_qp_delta_abs | ae(v) |
|       if( cu_qp_delta_abs) | |
|         cu_qp_delta_sign_flag | ae(v) |
|     } | |
|   } | |

TABLE 2-continued

| | Descriptor |
|---|---|
| if( ( tu_cbf_cb[ x0 ][ y0 ] \|\| tu_cbf_cr[ x0 ][ y0 ] ) ) { | |
|   if( cu_chroma_qp_offset_enabled_flag && !IsCuChromaQpOffsetCoded) { | |
|     cu_chroma_qp_offset_flag | ae(v) |
|     if( cu_chroma_qp_offset_flag && chroma_qp_offset_list_len_minus1 > 0 ) | |
|       cu_chroma_qp_off_set_idx | ae(v) |
|   } | |
| } | |
| if( sps_joint_cbcr_enabled_flag && ( ( CuPredMode[ chType ][ x0 ][ y0 ] = = | |
| MODE_INTRA | |
|     && ( tu_cbf_cb[ x0 ][ y0 ] \|\| tu_cbf_cr[ x0 ][ y0 ] ) ) ) \|\| | |
|   ( tu_cbf_cb[ x0 ][ y0 ] && tu_cbf_cr[ x0 ][ y0 ] ) ) ) | |
|   tu_joint_cbcr_residual_flag[ x0 ][ y0 ] | ae(v) |
| if( tu_cbf_luma[ x0 ][ y0 ] && treeType != DUAL_TREE_CHROMA | |
|   && ( tbWidth <= 32 ) && ( tbHeight <= 32 ) | |
|   && ( IntraSubPartitionsSplit[ x0 ][ y0 ] = = ISP_NO_SPLIT ) && | |
| ( !cu_sbt_flag ) ) { | |
|   if( sps_transform_skip_enabled_flag && !BdpcmFlag[ x0 ][ y0 ] && | |
|     tbWidth <= MaxTsSize && tbHeight <= MaxTsSize ) | |
|     transform_skip_flag[ x0 ][ y0 ] | ae(v) |
|   if( ( ( CuPredMode[ chType ][ x0 ][ y0 ] = = MODE_INTER && | |
|     sps_explicit_mts_inter_enabled_flag ) | |
|     \|\| ( CuPredMode[ chType ][ x0 ][ y0 ] = = MODE_INTRA && | |
|     sps_explicit_mts_intra_enabled_flag ) ) && ( !transform_skip_flag[ x0 ] | |
| [ y0 ] ) ) | |
|     tu_mts_idx[ x0 ][ y0 ] | ae(v) |
| } | |
| if( tu_cbf_luma[ x0 ][ y0 ] ) { | |
|   if( !transform_skip_flag[ x0 ][ y0 ] ) | |
|     residual_coding( x0, y0, Log2( tbWidth ), Log2( tbHeight ), 0 ) | |
|   else | |
|     residual_ts_coding( x0, y0, Log2( tbWidth ), Log2( tbHeight ), 0 ) | |
| } | |
| if( tu_cbf_cb[ x0 ][ y0 ] ) | |
|   residual_coding( xC, yC, Log2( wC ), Log2( hC ), 1 ) | |
| if( tu_cbf_cr[ x0 ][ y0 ] && | |
|   !( tu_cbf_cb[ x0 ][ y0 ] && tu_joint_cbcr_residual_flag[ x0 ][ y0 ] )) { | |
|   residual_coding( xC, yC, Log2( wC ), Log2( hC ), 2 ) | |
| } | |
| } | |

The transform coefficient level may be represented as the array TransCoeffLevel[x0][y0][cIdx][xC][yC]. Here, the array indices x0 and y0 may represent the position (x0, y0) of the top-left luma sample of the corresponding transform block for the top-left luma sample of the picture. That is, when the position of the top-left luma sample of the picture is (0, 0), the array indices x0 and y0 may represent the position (x0, y0) of the top-left luma sample of the corresponding transform block. Also, the array index cIdx may represent an index for a color component. For example, the value of the array index for the luma component (Y component) may be equal to 0; the value of the array index for the chroma Cb component may be equal to 1; and the value of the array index for the chroma Cr component may be equal to 2. Additionally, the array indices xC and yC may represent the position (xC, yC) of the transform coefficient in the current transform block. Meanwhile, if the value of TransCoeffLevel[x0][y0][cIdx][xC][yC] is not specified, the value may be inferred as being equal to 0.

Also, for example, if the syntax element tu_cbf_cb[x0][y0] is 1, it may represent that one or more non-zero transform coefficient levels are included in the Cb transform block. Here, the array indices x0 and y0 may represent the top-left position (x0, y0) of the considered transform block. When the syntax element tu_cbf_cb[x0][y0] does not exist in the current TU, the value of the syntax element tu_cbf_cb [x0][y0] may be inferred as 0. Additionally, the tu_cbf_cb [x0][y0] may be expressed as tu_cb_coded_flag[x0][y0].

Also, for example, if the syntax element tu_cbf_cr[x0] [y0] is 1, it may represent that one or more non-zero transform coefficient levels are included in the Cr transform block. Here, the array indices x0 and y0 may represent the top-left position (x0, y0) of the considered transform block. When the syntax element tu_cbf_cr[x0][y0] does not exist in the current TU, the value of the syntax element tu_cbf_cr [x0][y0] may be inferred as 0. Additionally, the tu_cbf_cr [x0][y0] may be expressed as tu_cr_coded_flag[x0][y0].

Also, for example, if the syntax element tu_cbf_luma[x0] [y0] is 1, it may represent that one or more non-zero transform coefficient levels are included in the luma transform block. Here, the array indices x0 and y0 may represent the position (x0, y0) of the top-left luma sample of the corresponding transform block for the top-left luma sample of the picture. That is, when the position of the top-left luma sample of the picture is (0, 0), the array indices x0 and y0 may represent the position (x0, y0) of the top-left luma sample of the corresponding transform block. When the syntax element tu_cbf_luma[x0][y0] does not exist in the current TU, the value of the syntax element tu_cbf_luma [x0][y0] may be inferred as follows.

For example, when the value of cu_sbt_flag is 1 and one of the conditions to be described later is true, the value of the syntax element tu_cbf_luma[x0][y0] may be inferred as 0.

When the value of subTuIndex is 0 and the value of cu_sbt_pos_flag is 1

When the value of subTuIndex is 1 and the value of cu_sbt_pos_flag is 0

Meanwhile, in other cases, the value of the syntax element tu_cbf_luma[x0][y0] may be inferred as 1. Additionally, the tu_cbf_luma[x0][y0] may be expressed as tu_y_coded_flag [x0][y0].

Also, for example, the syntax element tu_joint_cbcr_residual_flag[x0][y0] may indicate whether or not residual samples for the chroma component Cb and the chroma component Cr are coded with a single transform block. Here, the array indices x0 and y0 may represent the position (x0, y0) of the top-left luma sample of the corresponding transform block for the top-left luma sample of the picture. That is, when the position of the top-left luma sample of the picture is (0, 0), the array indices x0 and y0 may represent the position (x0, y0) of the top-left luma sample of the corresponding transform block.

For example, if the syntax element tu_joint_cbcr_residual_flag[x0][y0] is 1, it may indicate that the transform unit syntax includes a transform coefficient level for a single transform block from which residual samples for the chroma component Cb and the chroma component Cr are derived. Also, for example, if the syntax element tu_joint_cbcr_residual_flag[x0][y0] is 0, it may indicate that the transform coefficient levels of the chroma components are coded as represented by the syntax elements tu_cbf_cb[x0][y0] and tu_cbf_cr[x0][y0]. When the syntax element tu_joint_cbcr_residual_flag[x0][y0] does not exist, the value of the syntax element tu_joint_cbcr_residual_flag[x0][y0] may be inferred as 0.

For example, according to tu_joint_cbcr_residual_flag[x0][y0], tu_cbf_cb[x0][y0], and tu_cbf_cr[x0][y0], the variable TuCResMode[x0][y0] may be derived as follows.

For example, when the value of tu_joint_cbcr_residual_flag[x0][y0] is 0, the variable TuCResMode[x0][y0] may be set to 0.

If it does not correspond to the above-described case and tu_cbf_cb[x0][y0] is 1 and tu_cbf_cr[x0][y0] is 0, the variable TuCResMode[x0][y0] may be set to 1.

If it does not correspond to the above-described cases and tu_cbf_cb[x0][y0] is 1, the variable TuCResMode[x0][y0] may be set to 2.

If it does not correspond to the above-described cases, the variable TuCResMode[x0][y0] may be set to 3.

Also, for example, the syntax element cu_qp_delta_abs may represent an absolute value of a difference CuQpDeltaVal between a quantization parameter of the current coding unit and its prediction.

Also, for example, the syntax element cu_qp_delta_sign_flag may represent the sign of CuQpDeltaVal as follows.

For example, when cu_qp_delta_sign_flag is 0, the corresponding CuQpDeltaVal may have a positive value.

If it does not correspond to the above-described case (i.e., when cu_qp_delta_sign_flag is 1), the corresponding CuQpDeltaVal may have a negative value.

Meanwhile, when the syntax element cu_qp_delta_sign_flag does not exist, the value of the syntax element cu_qp_delta_sign_flag may be inferred as 0.

Also, for example, when cu_qp_delta_abs is present, the variable IsCuQpDeltaCoded and the variable CuQpDeltaVal may be derived as the following equation.

$$IsCuQpDeltaCoded = 1 \qquad \text{[Equation 3]}$$
$$CuQpDeltaVal = cu\_qp\_delta\_abs * (1 - 2 * cu\_qp\_delta\_sign\_flag)$$

The value of CuQpDeltaVal may be in the range of −(32+QpBdOffsetY/2) to +(31+QpBdOffsetY/2).

Also, for example, if the syntax element cu_chroma_qp_offset_flag is present and equal to 1, the syntax element cu_chroma_qp_offset_flag may indicate that the entry of cb_qp_offset_list[ ] is used to determine the value of CuQpOffset$_{Cb}$, that the corresponding entry of cr_qp_offset_list[ ] is used to determine the value of CuQpOffset$_{Cr}$, and that the corresponding entry in joint_cbcr_qp_offset_list[ ] is used to determine the value of CuQpOffset$_{CbCr}$. Also, for example, if the syntax element cu_chroma_qp_offset_ flag is 0, the syntax element cu_chroma_qp_offset_flag may indicate that cb_qp_offset_list[ ], cr_qp_offset_list[ ], and joint_cbcr_qp_offset_list[ ] are not used to determine the values of CuQpOffset$_{Cb}$, CuQpOffset$_{Cr}$, and CuQpOffset$_{CbCr}$.

Also, for example, when the syntax element cu_chroma_qp_offset_idx is present, the syntax element cu_chroma_qp_offset_idx may represent indices in cb_qp_offset_list[ ], cr_qp_offset_list[ ] and joint_cbcr_qp_offset_list[ ] used to determine the values of CuQpOffset$_{Cb}$, CuQpOffset$_{Cr}$ and CuQpOffset$_{CbCr}$. When the syntax element cu_chroma_qp_offset_idx is present, the value of the syntax element cu_chroma_qp_offset_idx may be in the range from 0 to chroma_qp_offset_list_len_minus1. When the syntax element cu_chroma_qp_offset_idx is not present, the syntax element cu_chroma_qp_offset_idx may be inferred as 0.

Further, for example, when the syntax element cu_chroma_qp_offset_flag is present, the following description may be applied.

If cu_chroma_qp_offset_flag is 1, values of CuQpOffset$_{Cb}$, CuQpOffset$_{Cr}$, and CuQpOffset$_{CbCr}$ may be derived as shown in the following equation.

$$CuQpOffsct_{Cb} = \qquad \text{[Equation 4]}$$
$$cb\_qp\_offsct\_list[cu\_chroma\_qp\_offset\_idx]$$
$$CuQpOffset_{Cr} = cr\_qp\_offset\_list[cu\_chroma\_qp\_offset\_idx]$$
$$CuQpOffset_{CbCr} = joint\_cbcr\_qp\_offset\_list[cu\_chroma\_qp\_offset\_idx]$$

If it does not correspond to the above-described case (i.e., when cu_chroma_qp_offset_flag is 0), CuQpOffset$_{Cb}$, CuQpOffset$_{Cr}$, and CuQpOffset$_{CbCr}$ may be set to 0.

Additionally, for example, the syntax element transform_skip_flag[x0][y0] may indicate whether or not a transform is applied to the luma transform block. Here, the array indices x0 and y0 may represent the position (x0, y0) of the top-left luma sample of the corresponding transform block for the top-left luma sample of the picture. That is, when the position of the top-left luma sample of the picture is (0, 0), the array indices x0 and y0 may represent the position (x0, y0) of the top-left luma sample of the corresponding transform block. For example, if transform_skip_flag[x0][y0] is 1, it may indicate that no transform is applied to the luma transform block. Also, for example, if transform_skip_flag[x0][y0] is 0, it may indicate that whether or not a transform is applied to the luma transform block may be determined based on another syntax element.

Additionally, for example, when the transform_skip_flag[x0][y0] does not exist, the value of the transform_skip_flag[x0][y0] may be inferred as follows.

For example, if BdpcmFlag[x0][y0] is 1, the transform_skip_flag[x0][y0] may be inferred as 1.

If it does not correspond to the above-described case (i.e., for example, when BdpcmFlag[x0][y0] is 0), the transform_skip_flag[x0][y0] may be inferred as 0.

Additionally, for example, the syntax element tu_mts_idx[x0][y0] may represent transform kernels applied to residual samples in a horizontal direction and a vertical direction of an associated luma transform block. Here, the array indices x0 and y0 may represent the position (x0, y0) of the top-left luma sample of the corresponding transform block for the top-left luma sample of the picture. That is, when the position of the top-left luma sample of the picture is (0, 0), the array indices x0 and y0 may represent the position (x0, y0) of the top-left luma sample of the corresponding transform block. Also, for example, when the syntax element tu_mts_idx[x0][y0] is not present, the syntax element tu_mts_idx[x0][y0] may be inferred as 0.

Figure 7:
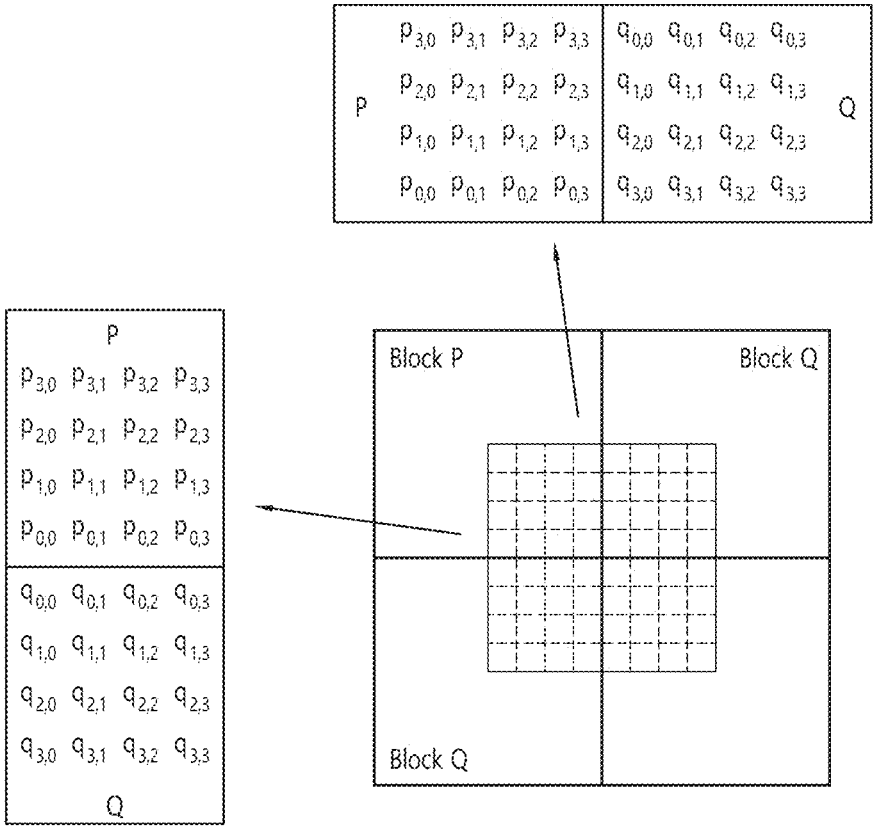
FIG. 7 exemplarily represents a sample position for deblocking filtering.

FIG. 7 exemplarily represents a sample position for deblocking filtering.

Meanwhile, the chroma QP may be used for deblocking filtering of the chroma component. However, for example, slice level and CU level QP adjustment may not be considered for chroma QP used for deblocking filtering. For example, the chroma QP used for deblocking filtering may be derived based on the corresponding luma QP and the picture level chroma QP offset cQpPicOffset. Here, for example, cQpPicOffset representing the picture level chroma QP offset may be derived as pps_cb_qp_offset if cIdx is 1, and may be derived as pps_cr_qp_offset if cIdx is not 1.

Additionally, for example, the variable $Qp_Q$ may be set equal to the $Qp_Y$ value of the coding unit including the coding block including the sample $q_{0,0}$ shown in FIG. 6, and the variable $Qp_P$ may be set equal to the $Qp_Y$ value of the coding unit including the coding block including the sample $p_{0,0}$ shown in FIG. 6.

Thereafter, the chroma QP $Qp_C$ used for deblocking filtering may be derived as in the following equation.

$$qPi = \text{Clip } 3\big(0,\ 63,\ \big((Qp_Q + Qp_p + 1) >> 1\big) + cQpPicOffet\big) \qquad \text{[Equation 5]}$$

$$Qp_C = ChromaQpTable[cIdx-1][qPi]$$

existing VVC standard. Since VVC supports dual trees, there may be a big difference between luma QP and chroma QP of a CU because the partitions of the luma block and the chroma block are different. In addition, the VVC standard supports YUV 4:2:2 format and YUV 4:4:4 format as well as YUV 4:2:0 format. Here, in the case of the YUV 4:4:4 format, if an inaccurate chroma QP is used for deblocking filtering, it may have a greater effect, and a visual artifact may occur.

Accordingly, this document proposes an efficient chroma QP signaling scheme as in the embodiments to be described later.

In one embodiment, chroma QP offset signaling supporting a VDPU level process is proposed. In this embodiment, for a chroma CU with cbWidth or cbHeight greater than 64, the CU chroma QP offset (when the chroma QP offset for the chroma CU is present) may be signaled regardless of whether or not a non-zero chroma CBF is included in the first TU. That is, according to this embodiment, when the cbWidth or cbHeight of the current chroma CU is greater than 64, the CU chroma QP offset (when the chroma QP offset for the chroma CU is present) may be signaled regardless of whether or not the first TU has a non-zero coefficient. Here, the cbWidth and the cbHeight may represent a CU width and a CU height of a luma element or a chroma element according to a channel type or a tree type. For example, in the case of an image of the YUV 4:4:4 format, since a chroma CU with a width or a height greater than 64 may be generated, a VDPU level process is possible through the method proposed in this embodiment, and a QP may be enable when the VDPU is parsed.

For example, the transform unit syntax according to the present embodiment may be as shown in the following table.

TABLE 3

| | Descriptor |
|---|---|
| transform_unit( x0, y0, tbWidth, tbHeight, treeType, subTuIndex, chType ) { | |
|   . . . | |
|   if( ( CbWidth[ chType ][ x0 ][ y0 ] > 64 \|\| CbHeight[ chType ] | |
| [ x0 ][ y0 ] > 64 \|\| | |
|     tu_cbf_luma[ x0 ][ y0 ] \|\| tu_cbf_cb[ x0 ][ y0 ] \|\| tu_cbf_cr | |
| [ x0 ][ y0 ] ) && | |
|     treeType != DUAL_TREE_CHROMA ) { | |
|     if( cu_qp_delta_enabled_flag && !IsCuQpDeltaCoded ) { | |
|       cu_qp_delta_abs | ae(v) |
|       if( cu_qp_delta_abs ) | |
|         cu_qp_delta_sign_flag | ae(v) |
|     } | |
|     } | |
|   if( ( CbWidth[ chType ][ x0 ][ y0 ] > 64 \|\| CbHeight[ chType ] | |
| [ x0 ][ y0 ] > 64 \|\| tu_cbf_cb[ x0 ][ y0 ] \|\| tu_cbf_cr[ x0 ][ y0 ] ) { | |
|     if( cu_chroma_qp_offset_enabled_flag && !IsCuChromaQpOffsetCoded ) { | |
|       cu_chroma_qp_offset_flag | ae(v) |
|       if( cu_chroma_qp_offset_flag && chroma_qp_offset_list_len_minus1 > 0 ) | |
|         cu_chroma_qp_offset_idx | ae(v) |
|     } | |
|   } | |
|   . . . | |
| } | |

Meanwhile, there may be some disadvantages in the design related to chroma QP for deblocking filtering of the Referring to Table 3, "CbWidth[chType][x0][0]> 64\|\|CbHeight[chType][x0][y0]>64\|\|" may be added to the signaling condition of CU chroma QP offset related information. That is, referring to Table 3, when CbWidth[chType] [x0][y0] is greater than 64 or CbHeight[chType][x0][y0] is greater than 64, CU chroma QP offset related information may be signaled. The CU chroma QP offset related information may include a syntax element cu_chroma_qp_offset_flag and/or a syntax element cu_chroma_qp_offset_idx.

For example, if the syntax element cu_chroma_qp_offset_flag is present and equal to 1, the syntax element cu_chroma_qp_offset_flag may indicate that the entry of cb_qp_offset_list[ ] is used to determine the value of signaling for a dual tree. This embodiment proposes a method of modifying the availability condition of the existing syntax for the CU chroma QP offset flag in order to avoid unnecessary signaling. For example, according to the present embodiment, when the coding tree is dual tree luma (DUAL_TREE_LUMA), that is, when the coding tree is neither single tree (SINGLE_TREE) nor dual tree chroma (DUAL_TREE_CHROMA), CU chroma QP Offset related information may not be signaled.

For example, the transform unit syntax according to the present embodiment may be as shown in the following table.

TABLE 4

| | Descriptor |
|---|---|
| transform_unit( x0, y0, tbWidth, tbHeight, treeType, subTuIndex, chType ) { | |
| . . . | |
| if( ( CbWidth[ chType ][ x0 ][ y0 ] > 64 \|\| CbHeight[ chType ] [ x0 ][ y0 ] > 64 \|\| | |
| tu_cbf_luma[ x0 ][ y0 ] \|\| tu_cbf_cb[ x0 ][ y0 ] \|\| tu_cbf_cr [ x0 ][ y0 ] ) && | |
| treeType != DUAL_TREE_CHROMA ) { | |
| if( cu_qp_delta_enabled_flag && !IsCuQpDeltaCoded ) { | |
| cu_qp_delta_abs | ae(v) |
| if( cu_qp_delta_abs ) | |
| cu_qp_delta_sign_flag | ae(v) |
| } | |
| } | |
| if((tu_cbf_cb[ x0 ][ y0 ] \|\| tu_cbf_cr[ x0 ][ y0 ] ) &&treeType! = DUAL_TREE_LUMA) { | |
| if( cu_chroma_qp_offset_enabled_flag && !IsCuChromaQpOffsetCoded ) { | |
| cu_chroma_qp_offset_flag | ae(v) |
| if( cu_chroma_qp_offset_flag && chroma_qp_offset_list_len_minus1 > 0 ) | |
| cu_chroma_qp_offset_idx | ae(v) |
| } | |
| } | |
| . . . | |
| } | |

CuQpOffset$_{Cb}$, that the corresponding entry of cr_qp_offset_list[ ] is used to determine the value of CuQpOffset$_{Cr}$, and that the corresponding entry in joint_cbcr_qp_offset_list[ ] is used to determine the value of CuQpOffset$_{CbCr}$. Also, for example, if the syntax element cu_chroma_qp_offset_flag is 0, the syntax element cu_chroma_qp_offset_flag may indicate that cb_qp_offset_list[ ], cr_qp_offset_list[ ], and joint_cbcr_qp_offset_list[ ] are not used to determine the values of CuQpOffset$_{Cb}$, CuQpOffset$_{Cr}$, and CuQpOffset$_{CbCr}$.

Also, for example, when the syntax element cu_chroma_qp_offset_idx is present, the syntax element cu_chroma_qp_offset_idx may represent indices in cb_qp_offset_list[ ], cr_qp_offset_list[ ] and joint_cbcr_qp_offset_list[ ] used to determine the values of CuQpOffset$_{Cb}$, CuQpOffset$_{Cr}$ and CuQpOffset$_{CbCr}$. When the syntax element cu_chroma_qp_offset_idx is present, the value of the syntax element cu_chroma_qp_offset_idx may be in the range from 0 to chroma_qp_offset_list_len_minus1. When the syntax element cu_chroma_qp_offset_idx is not present, the syntax element cu_chroma_qp_offset_idx may be inferred as 0.

In addition, as an embodiment, this document proposes a method of adding a condition to CU level chroma QP offset Referring to Table 4, "&& treeType!= DUAL_TREE_LUMA" may be added to the signaling condition of CU chroma QP offset related information. That is, referring to Table 4, CU chroma QP offset related information may be signaled only when the coding tree is not DUAL_TREE_LUMA. The CU chroma QP offset related information may include a syntax element cu_chroma_qp_offset_flag and/or a syntax element cu_chroma_qp_offset_idx.

Additionally, as an embodiment, this document proposes another method of adding a condition to CU level chroma QP offset signaling. This embodiment proposes a method of modifying the availability condition of the existing syntax for the CU chroma QP offset flag in order to avoid unnecessary signaling. For example, this embodiment proposes a method of modifying the availability condition of an existing syntax by combining the signaling conditions of the above-described embodiments.

For example, the transform unit syntax according to the present embodiment may be as shown in the following table.

TABLE 5

| | Descriptor |
|---|---|
| transform_unit( x0, y0, tbWidth, tbHeight, treeType, subTuIndex, chType ) { | |
| . . . | |
|   if( ( CbWidth[ chType ][ x0 ][ y0 ] > 64 \|\| CbHeight[ chType ] | |
| [ x0 ][ y0 ] > 64 \|\| | |
|     tu_cb_luma⌈ x0 ⌉ y0 ⌉ \|\| tu_cbf_cb⌈ x0 ⌉ y0 ⌉ \|\| tu_cbf_cr | |
| ⌈ x0 ⌈ y0 ⌉ ) && | |
|     treeType != DUAL_TREE_CHROMA ) { | |
|     if( cu_qp_delta_enabled_flag && !IsCuQpDeltaCoded ) { | |
|       cu_qp_delta_abs | ae(v) |
|       if( cu_qp_delta_abs ) | |
|         cu_qp_delta_sign_flag | ae(v) |
|     } | |
|   } | |
|   if((CbWidth[ chType ][ x0 ][ y0 ] > 64 \|\| CbHeight[ chType ] | |
| [ x0 ][ y0 ] > 64 \|\| tu_cbf_cb⌈ x0 ⌉ y0 ⌉ \|\| tu_cbf_cr⌈ x0 ⌉ y0 ⌉ ) && treeType != | |
| DUAL_TREE_LUMA) { | |
|     if( cu_chroma_qp_offset_enabled_flag && !IsCuChromaQpOffsetCoded ) { | |
|       cu_chroma_qp_offset_flag | ae(v) |
|       if( cu_chroma_qp_offset_flag && chroma_qp_offset_list_len_minus1 > 0 ) | |
|         cu_chroma_qp_offset_idx | ae(v) |
|     } | |
|   } | |
| . . . | |
| } | |

Referring to Table 5, "CbWidth[chType][x0][y0]>64||CbHeight[chType][x0][y0]>64||" and "&& treeType!=DUAL_TREE_LUMA" may be added to the signaling condition of CU chroma QP offset related information. That is, referring to Table 5, if the coding tree is not DUAL_TREE_LUMA and CbWidth[chType][x0][y0] is greater than 64, or CbHeight[chType][x0][y0] is greater than 64, CU chroma QP offset related information may be signaled. Accordingly, when the coding tree is DUAL_TREE_LUMA, CU chroma QP offset related information may not be signaled. The CU chroma QP offset related information may include a syntax element cu_chroma_qp_offset_flag and/or a syntax element cu_chroma_qp_offset_idx.

Additionally, this document proposes a method of using CU level chroma QP for deblocking filtering. This embodiment proposes a method of integrating slice-level chroma QP and/or CU-level chroma QP into chroma QP expressed as QpC and used in the chroma deblocking process. The deblocking parameter may be determined based on the derived QpC.

For example, the variable QpC may be derived based on Qp of neighboring CUs as shown in the following equation.

$$QpC = \text{Clip3}\left(0, 63, \left(\left(Qp_{Q'cIdx} + Qp_{P'cIdx} + 1\right) >> 1\right)\right) \quad \text{[Equation 6]}$$

Here, $Qp_{Q}'cIdx$ may represent a chroma QP of a CU P adjacent to a block boundary to be deblocking filtered, and $Qp_{P}'cIdx$ may represent a chroma QP of a CU Q adjacent to a block boundary to be deblocking filtered. Also, cIdx may be an index representing a chroma component. For example, cIdx may represent a chroma Cb component, a chroma Cr component, or a chroma CbCr component. $Qp_{Q}'cIdx$ and $Qp_{P}'cIdx$ may be values for which slice level QP adjustment and CU level QP adjustment have already been considered.

Alternatively, for example, the variable QpC may first be derived based on the luma QP of the neighboring CU P and the neighboring CU Q, and then the slice level QP adjustment and the CU level QP adjustment may be added. For example, the variable QpC may be derived as follows.

$$qPi = \text{Clip3}\left(0, 63, \left(\left(Qp_{Q} + Qp_{P} + 1\right) >> 1\right) + cQpPicOffset\right) \quad \text{[Equation 7]}$$

$$QpC = ChromaQpTable\left[cIdx-1\right][qPi] +$$

$$SliceQpOffset_{cIdx} + \left(\left(CuQpOffset_{PcIdx} + CuQpOffset_{PcIdx} + 1\right) >> 1\right)$$

Here, $CuQpOffset_{PcIdx}$ may represent the CuQPOffset of the element cIdx of the neighboring CU P, and $CuQpOffset_{QcIdx}$ may represent the CuQPOffset of the element cIdx of the neighboring CU Q.

Figure 8:
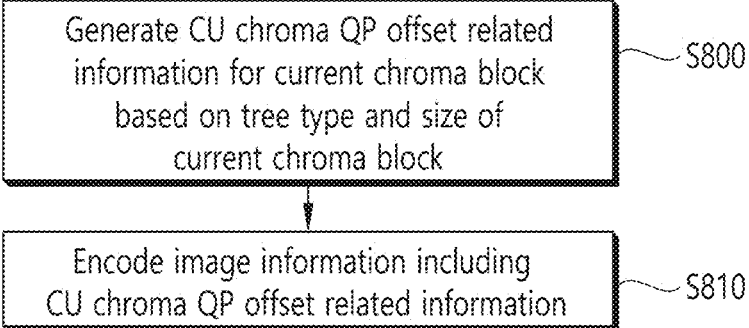
FIG. 8 schematically shows an image encoding method by an encoding apparatus according to the present document.

FIG. 8 schematically shows an image encoding method by an encoding apparatus according to the present document. The method disclosed in FIG. 8 may be performed by the encoding apparatus disclosed in FIG. 2. Specifically, for example, S800 to S810 in FIG. 8 may be performed by the entropy encoder of the encoding apparatus. In addition, although not shown, the process of deriving prediction samples of the current chroma block may be performed by a predictor of the encoding apparatus, the process of deriving residual samples of the current chroma block may be performed by a residual processor of the encoding apparatus, and the process of generating reconstructed samples and a reconstructed picture based on the residual samples and the prediction samples may be performed by an adder of the encoding apparatus.

The encoding apparatus generates Coding Unit (CU) chroma Quantization Parameter (QP) offset related information for a current chroma block based on a size and a tree type of the current chroma block (S800).

The encoding apparatus may generate the CU chroma quantization parameter (QP) offset related information for the current chroma block based on the size and the tree type of the current chroma block. The CU chroma QP offset related information may be referred to as CU level chroma QP offset related information. Here, the tree type may be one of a single tree, a dual tree luma, and a dual tree chroma. Additionally, for example, the CU chroma QP offset related information may be signaled as a transform unit syntax for a first transform block in the current chroma block. That is, for example, the transform unit syntax for the first transform block may include the CU chroma QP offset related information. The first transform block may be a transform block among the transform blocks of the current chroma block, which is coded first in decoding order. For example, the first transform block may be a top-left transform block among the transform blocks of the current chroma block.

Specifically, for example, when at least one of the width and height of the current chroma block is greater than a specific value, the CU chroma QP offset related information for the current chroma block may be signaled. That is, for example, when at least one of the width and height of the current chroma block is greater than a specific value, the CU chroma QP offset related information for the current chroma block may be generated. In this connection, for example, the specific value may be 64. Additionally, for example, the transform unit syntax for the first transform block may include the CU chroma QP offset related information for the current chroma block. For example, when at least one of the width and height of the current chroma block is greater than the specific value, the CU chroma QP offset related information for the current chroma block may be signaled in the transform unit syntax for the first transform block regardless of whether or not the first transform block includes at least one non-zero transform coefficient level. That is, for example, when at least one of the width and height of the current chroma block is greater than the specific value, the transform unit syntax for the first transform block may include the CU chroma QP offset related information for the current chroma block regardless of whether or not the first transform block includes at least one non-zero transform coefficient level.

Alternatively, for example, when the tree type is the dual tree luma, the CU chroma QP offset related information for the current chroma block may not be signaled. That is, for example, when the tree type is the dual tree luma, the CU chroma QP offset related information for the current chroma block may not be generated. Thus, for example, when the tree type is not the dual tree luma (that is, when the tree type is one of single tree and dual tree chroma), the CU chroma QP offset related information for the current chroma block may be signaled. That is, for example, when the tree type is not the dual tree luma (that is, when the tree type is one of single tree and dual tree chroma), the CU chroma QP offset related information for the current chroma block may be generated. In this connection, for example, the transform unit syntax for the first transform block may include the CU chroma QP offset related information for the current chroma block. For example, when the tree type is not the dual tree luma (that is, when the tree type is one of single tree and dual tree chroma), the CU chroma QP offset related information for the current chroma block may be signaled through the transform unit syntax for the first transform block regardless of whether or not the first transform block includes at least one non-zero transform coefficient level. That is, for example, when the tree type is not the dual tree luma (that is, when the tree type is one of single tree and dual tree chroma), the transform unit syntax for the first transform block may include the CU chroma QP offset related information for the current chroma block regardless of whether or not the first transform block includes at least one non-zero transform coefficient level.

Alternatively, for example, when at least one of the width and height of the current chroma block is greater than a specific value, and when the tree type is not the dual tree luma (that is, when the tree type is one of single tree and dual tree chroma), the CU chroma QP offset related information for the current chroma block may be signaled. That is, for example, when at least one of the width and height of the current chroma block is greater than a specific value, and when the tree type is not the dual tree luma (that is, when the tree type is one of single tree and dual tree chroma), the CU chroma QP offset related information for the current chroma block may be generated. In this connection, for example, the specific value may be 64. Accordingly, for example, when the tree type is the dual tree luma, the CU chroma QP offset related information for the current chroma block may not be signaled. Additionally, for example, the transform unit syntax for the first transform block may include the CU chroma QP offset related information for the current chroma block. For example, when at least one of the width and height of the current chroma block is greater than the specific value, and when the tree type is not the dual tree luma (that is, when the tree type is one of single tree and dual tree chroma), the CU chroma QP offset related information for the current chroma block may be signaled through the transform unit syntax for the first transform block regardless of whether or not the first transform block includes at least one non-zero transform coefficient level. That is, for example, when at least one of the width and height of the current chroma block is greater than the specific value, and when the tree type is not the dual tree luma (that is, when the tree type is one of single tree and dual tree chroma), the transform unit syntax for the first transform block may include the CU chroma QP offset related information for the current chroma block regardless of whether or not the first transform block includes at least one non-zero transform coefficient level.

Meanwhile, for example, the CU chroma QP offset related information may include a CU chroma QP offset index and/or a CU chroma QP offset flag for the current chroma block. The CU chroma QP offset flag may also be referred to as a CU level chroma QP offset flag, and the CU chroma QP offset index may also be referred to as a CU level chroma QP offset index.

For example, the CU chroma QP offset flag may be a flag for whether or not an entry in the CU QP offset list for the chroma component is used to determine the value of the CU chroma QP offset. That is, for example, the CU chroma QP offset flag may represent whether or not an entry in the CU QP offset list for the chroma component is used to determine the value of the CU chroma QP offset. For example, when the CU chroma QP offset flag is present, and when the value of the CU chroma QP offset flag is 1, the CU chroma QP offset flag may represent that an entry in a CU QP offset list for a chroma component is used to determine the value of the CU chroma QP offset. Also, for example, when the value of the CU chroma QP offset flag is 0, the CU chroma QP offset flag may represent that the CU QP offset list for the chroma component is not used to determine the value of the CU chroma QP offset. Here, for example, the chroma component may include a Cb component, a Cr component, and/or a joint CbCr component. Additionally, for example, the syntax element of the CU chroma QP offset flag may be the above-described cu_chroma_qp_offset_flag.

In addition, for example, the CU chroma QP offset index may represent an index of an entry in a CU QP offset list used to determine a value of the CU chroma QP offset. That is, for example, the CU chroma QP offset index may be information about an index of an entry in the CU QP offset list. Further, for example, the syntax element of the CU chroma QP offset index may be the above-described cu_chroma_qp_offset_idx.

The encoding apparatus encodes image information including the CU chroma QP offset related information (S810). The encoding apparatus may encode the CU chroma QP offset related information. The image information may include the CU chroma QP offset related information.

Meanwhile, for example, the encoding apparatus may generate and encode prediction information for the current chroma block. In this case, various prediction methods disclosed in this document, such as inter prediction or intra prediction, may be applied. For example, the encoding apparatus may determine whether to perform inter prediction or intra prediction on the current chroma block, and may determine specific inter prediction mode or specific intra prediction mode based on RD cost. According to the determined mode, the encoding apparatus may derive prediction samples for the current chroma block. The prediction information may include prediction mode information for the current chroma block. The image information may include the prediction information.

In addition, for example, the encoding apparatus may encode residual information for residual samples of the current chroma block.

For example, the encoding apparatus may derive the residual samples through the subtraction of the prediction samples and the original samples for the current chroma block.

Then, for example, the encoding apparatus may derive quantized residual samples by quantizating the residual samples based on a chroma QP for the current chroma block, and derive transform coefficients based on the quantized residual samples, and generate and encode the residual information based on the transform coefficients. Alternatively, for example, the encoding apparatus may derive quantized residual samples by quantizating the residual samples based on a chroma QP for the current chroma block, derive transform coefficients by transforming the quantized residual samples, and generate and encode the residual information based on the transform coefficients.

Here, the chroma QP for the current chroma block may be derived based on the CU chroma QP offset related information for the current chroma block. For example, the encoding apparatus may derive a CU chroma QP offset for the current chroma block based on the CU chroma QP offset related information, and may derive the chroma QP for the current chroma block based on the CU chroma QP offset. Specifically, for example, the encoding apparatus may derive the chroma QP for the current chroma block through addition of the CU chroma QP offset and the first chroma QP for the chroma component.

Specifically, for example, the encoding apparatus may derive the first chroma QP for the chroma component of the current chroma block based on the luma QP and/or chroma QP mapping table, may derive the CU chroma QP offset for the current chroma block based on the CU chroma QP offset related information, and may derive the chroma QP for the current chroma block based on the first chroma QP and the CU chroma QP offset. Here, for example, the first chroma QP may be referred to as a sequence parameter set (SPS) chroma QP or an SPS level chroma QP.

The image information may include the residual information. Additionally, for example, the encoding apparatus may encode image information and output it in the form of a bitstream.

Meanwhile, for example, the encoding apparatus may generate reconstructed samples and/or a reconstructed picture through addition of the prediction samples and the residual samples.

After this, as described above, an in-loop filtering procedure such as an ALF procedure, SAO and/or deblocking filtering may be applied as needed to the reconstructed samples in order to improve subjective/objective video quality.

Meanwhile, for example, deblocking filtering may be performed on an edge of the current chroma block. For example, a specific value may be derived based on the chroma QP of the current chroma block and a chroma QP of a neighboring block of the current chroma block adjacent to the edge, and a deblocking parameter for the deblocking filtering may be derived based on the specific value. For example, the specific value may be derived as in Equation 6 described above. The chroma QP of the current chroma block may be derived based on the CU chroma QP offset for the current chroma block as described above, and the chroma QP of the neighboring block may be derived based on a CU chroma QP offset for the neighboring block. Here, for example, the edge may represent an area of the current chroma block to which the deblocking filtering is applied.

Alternatively, for example, a specific value may be derived based on the chroma QP of the current chroma block, a chroma QP of a neighboring block of the current chroma block adjacent to the edge, and on the CU chroma QP offset, and the deblocking parameter for the deblocking filtering may be derived based on the specific value. For example, the specific value may be derived as in Equation 7 described above. Here, for example, the edge may represent an area of the current chroma block to which the deblocking filtering is applied.

Meanwhile, the bit stream including the image information may be transmitted to the decoding apparatus over a network or a (digital) storage medium. In this case, the network may include a broadcasting network and/or a communication network. The digital storage medium may include various storage media, such as a USB, an SD, a CD, a DVD, Blu-ray, an HDD, and an SSD.

Figure 9:
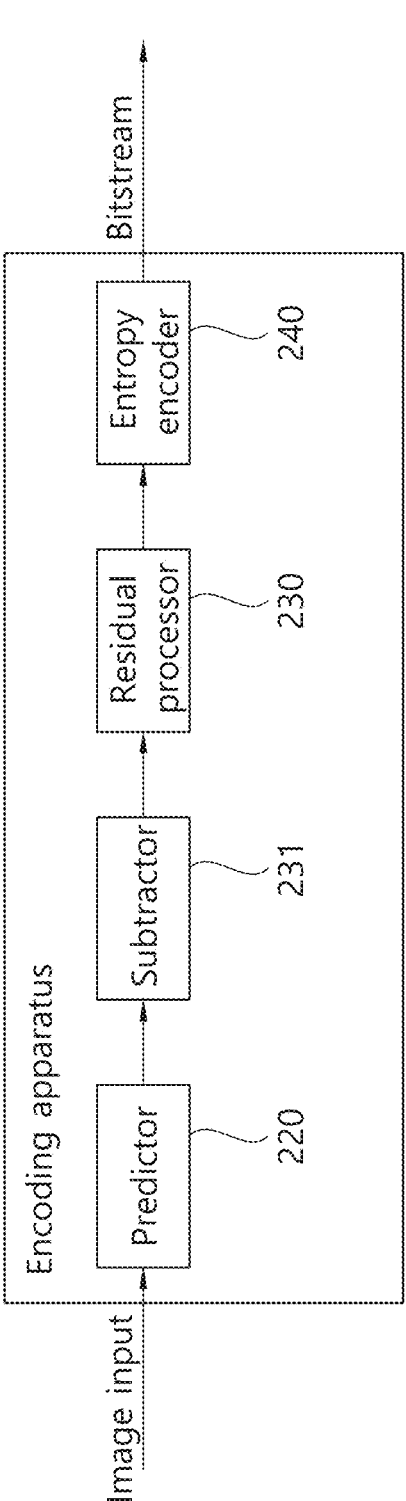
FIG. 9 schematically shows an encoding apparatus for performing an image encoding method according to this document.

FIG. 9 schematically shows an encoding apparatus for performing an image encoding method according to this document. The method disclosed in FIG. 8 may be performed by the encoding apparatus disclosed in FIG. 9. Specifically, for example, the entropy encoder of the encoding apparatus of FIG. 9 may perform S800 to S810. In addition, although not shown, the process of deriving prediction samples of the current chroma block may be performed by the predictor of the encoding apparatus, the process of deriving residual samples of the current chroma block may be performed by the residual processor of the encoding apparatus, and the process of generating reconstructed samples and a reconstructed picture based on the residual samples and the prediction samples may be performed by an adder of the encoding apparatus.

Figure 10:
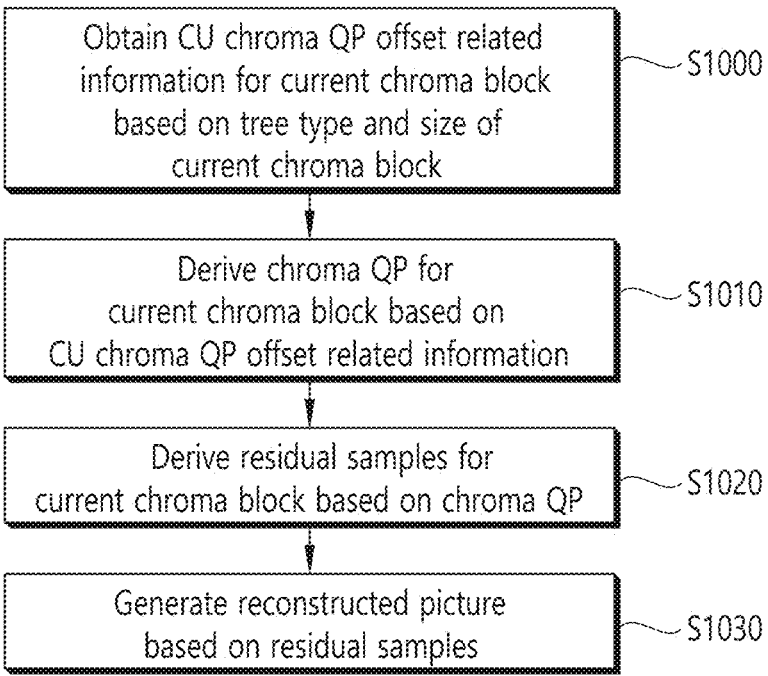
FIG. 10 schematically shows an image decoding method by a decoding apparatus according to this document.

FIG. 10 schematically shows an image decoding method by a decoding apparatus according to this document. The method disclosed in FIG. 10 may be performed by the decoding apparatus disclosed in FIG. 3. Specifically, for example, S1000 of FIG. 10 may be performed by an entropy decoder of the decoding apparatus; S1010 to S1020 of FIG. 10 may be performed by a residual processor of the decoding apparatus; and S1030 of FIG. 10 may be performed by an adder of the decoding apparatus.

The decoding apparatus obtains Coding Unit (CU) chroma Quantization Parameter (QP) related information for a current chroma block based on a tree type and a size of the current chroma block (S1000).

The decoding apparatus may obtain Coding Unit (CU) chroma Quantization Parameter (QP) related information for a current chroma block based on a tree type and a size of the current chroma block. The CU chroma QP offset related information may be referred to as CU level chroma QP offset related information. Here, the tree type may be one of a single tree, a dual tree luma, and a dual tree chroma. Additionally, for example, the CU chroma QP offset related information may be signaled as a transform unit syntax for a first transform block in the current chroma block. That is, for example, the transform unit syntax for the first transform block may include the CU chroma QP offset related information. The first transform block may be a transform block among the transform blocks of the current chroma block, which is decoded first in decoding order. For example, the first transform block may be a top-left transform block among the transform blocks of the current chroma block.

Specifically, for example, when at least one of the width and height of the current chroma block is greater than a specific value, the CU chroma QP offset related information for the current chroma block may be signaled. That is, for example, when at least one of the width and height of the current chroma block is greater than a specific value, the CU chroma QP offset related information for the current chroma block may be obtained. In this connection, for example, the specific value may be 64. Additionally, for example, the transform unit syntax for the first transform block may include the CU chroma QP offset related information for the current chroma block. For example, when at least one of the width and height of the current chroma block is greater than the specific value, the CU chroma QP offset related information for the current chroma block may be obtained as the transform unit syntax for the first transform block regardless of whether or not the first transform block includes at least one non-zero transform coefficient level. That is, for example, when at least one of the width and height of the current chroma block is greater than the specific value, the transform unit syntax for the first transform block may include the CU chroma QP offset related information for the current chroma block regardless of whether or not the first transform block includes at least one non-zero transform coefficient level.

Alternatively, for example, when the tree type is the dual tree luma, the CU chroma QP offset related information for the current chroma block may not be signaled. That is, for example, when the tree type is the dual tree luma, the CU chroma QP offset related information for the current chroma block may not be obtained. Thus, for example, when the tree type is not the dual tree luma (that is, when the tree type is one of single tree and dual tree chroma), the CU chroma QP offset related information for the current chroma block may be signaled. That is, for example, when the tree type is not the dual tree luma (that is, when the tree type is one of single tree and dual tree chroma), the CU chroma QP offset related information for the current chroma block may be obtained. In this connection, for example, the transform unit syntax for the first transform block may include the CU chroma QP offset related information for the current chroma block. For example, when the tree type is not the dual tree luma (that is, when the tree type is one of single tree and dual tree chroma), the CU chroma QP offset related information for the current chroma block may be obtained through the transform unit syntax for the first transform block regardless of whether or not the first transform block includes at least one non-zero transform coefficient level. That is, for example, when the tree type is not the dual tree luma (that is, when the tree type is one of single tree and dual tree chroma), the transform unit syntax for the first transform block may include the CU chroma QP offset related information for the current chroma block regardless of whether or not the first transform block includes at least one non-zero transform coefficient level.

Alternatively, for example, when at least one of the width and height of the current chroma block is greater than a specific value, and when the tree type is not the dual tree luma (that is, when the tree type is one of single tree and dual tree chroma), the CU chroma QP offset related information for the current chroma block may be signaled. That is, for example, when at least one of the width and height of the current chroma block is greater than a specific value, and when the tree type is not the dual tree luma (that is, when the tree type is one of single tree and dual tree chroma), the CU chroma QP offset related information for the current chroma block may be obtained. In this connection, for example, the specific value may be 64. Accordingly, for example, when the tree type is the dual tree luma, the CU chroma QP offset related information for the current chroma block may not be signaled. Additionally, for example, the transform unit syntax for the first transform block may include the CU chroma QP offset related information for the current chroma block. For example, when at least one of the width and height of the current chroma block is greater than the specific value, and when the tree type is not the dual tree luma (that is, when the tree type is one of single tree and dual tree chroma), the CU chroma QP offset related information for the current chroma block may be obtained through the transform unit syntax for the first transform block regardless of whether or not the first transform block includes at least one non-zero transform coefficient level. That is, for example, when at least one of the width and height of the current chroma block is greater than the specific value, and when the tree type is not the dual tree luma (that is, when the tree type is one of single tree and dual tree chroma), the transform unit syntax for the first transform block may include the CU chroma QP offset related information for the current chroma block regardless of whether or not the first transform block includes at least one non-zero transform coefficient level.

Meanwhile, for example, the CU chroma QP offset related information may include a CU chroma QP offset index and/or a CU chroma QP offset flag for the current chroma block. The CU chroma QP offset flag may also be referred to as a CU level chroma QP offset flag, and the CU chroma QP offset index may also be referred to as a CU level chroma QP offset index.

For example, the CU chroma QP offset flag may be a flag for whether or not an entry in the CU QP offset list for the chroma component is used to determine the value of the CU chroma QP offset. That is, for example, the CU chroma QP offset flag may represent whether or not an entry in the CU QP offset list for the chroma component is used to determine the value of the CU chroma QP offset. For example, when the CU chroma QP offset flag is present, and when the value of the CU chroma QP offset flag is 1, the CU chroma QP offset flag may represent that an entry in a CU QP offset list for a chroma component is used to determine the value of the CU chroma QP offset. Also, for example, when the value of the CU chroma QP offset flag is 0, the CU chroma QP offset flag may represent that the CU QP offset list for the chroma component is not used to determine the value of the CU chroma QP offset. Here, for example, the chroma component may include a Cb component, a Cr component, and/or a joint CbCr component. Additionally, for example, the syntax element of the CU chroma QP offset flag may be the above-described cu_chroma_qp_offset_flag.

In addition, for example, the CU chroma QP offset index may represent an index of an entry in a CU QP offset list used to determine a value of the CU chroma QP offset. That is, for example, the CU chroma QP offset index may be information about an index of an entry in the CU QP offset list. Further, for example, the syntax element of the CU chroma QP offset index may be the above-described cu_chroma_qp_offset_idx.

The decoding apparatus derives a chroma QP for the current chroma block based on the CU chroma QP offset related information (S1010). The decoding apparatus may derive the chroma QP for the current chroma block based on the CU chroma QP offset related information. For example, the decoding apparatus may derive a CU chroma QP offset for the current chroma block based on the CU chroma QP offset related information, and may derive the chroma QP for the current chroma block based on the CU chroma QP offset. Specifically, for example, the decoding apparatus may derive the chroma QP for the current chroma block through addition of the CU chroma QP offset and the first chroma QP for the chroma component.

Specifically, for example, the decoding apparatus may derive the first chroma QP for the chroma component of the current chroma block based on the luma QP and/or chroma QP mapping table, may derive the CU chroma QP offset for the current chroma block based on the CU chroma QP offset related information, and may derive the chroma QP for the current chroma block based on the first chroma QP and the CU chroma QP offset. Here, for example, the first chroma QP may be referred to as a sequence parameter set (SPS) chroma QP or an SPS level chroma QP.

The decoding apparatus derives residual samples for the current chroma block based on the chroma QP (S1020). The decoding apparatus may derive residual samples for the current chroma block based on the chroma QP.

For example, the decoding apparatus may derive transform coefficients for the current chroma block based on received residual information. Then, the decoding apparatus may derive the residual samples by dequantizing the transform coefficients based on the QP.

The decoding apparatus generates a reconstructed picture based on the residual samples (S1030). For example, the decoding apparatus may generate the reconstructed picture based on the residual samples.

Meanwhile, for example, the decoding apparatus may derive prediction samples by performing an inter prediction mode or an intra prediction mode for the current chroma block based on prediction information received through a bitstream, and may generate the reconstructed samples and/ or reconstructed picture through addition of the prediction samples and the residual samples.

After this, as described above, an in-loop filtering procedure such as an ALF procedure, SAO and/or deblocking filtering may be applied as needed to the reconstructed samples in order to improve subjective/objective video quality.

Meanwhile, for example, deblocking filtering may be performed on an edge of the current chroma block. For example, a specific value may be derived based on the chroma QP of the current chroma block and a chroma QP of a neighboring block of the current chroma block adjacent to the edge, and the deblocking parameter for the deblocking filtering may be derived based on the specific value. For example, the specific value may be derived as in Equation 6 described above. The chroma QP of the current chroma block may be derived based on the CU chroma QP offset for the current chroma block as described above, and the chroma QP of the neighboring block may be derived based on a CU chroma QP offset for the neighboring block. Here, for example, the edge may represent an area of the current chroma block to which the deblocking filtering is applied.

Alternatively, for example, a specific value may be derived based on the chroma QP of the current chroma block, a chroma QP of a neighboring block of the current chroma block adjacent to the edge, and on the CU chroma QP offset, and the deblocking parameter for the deblocking filtering may be derived based on the specific value. For example, the specific value may be derived as in Equation 7 described above. Here, for example, the edge may represent an area of the current chroma block to which the deblocking filtering is applied.

Figure 11:
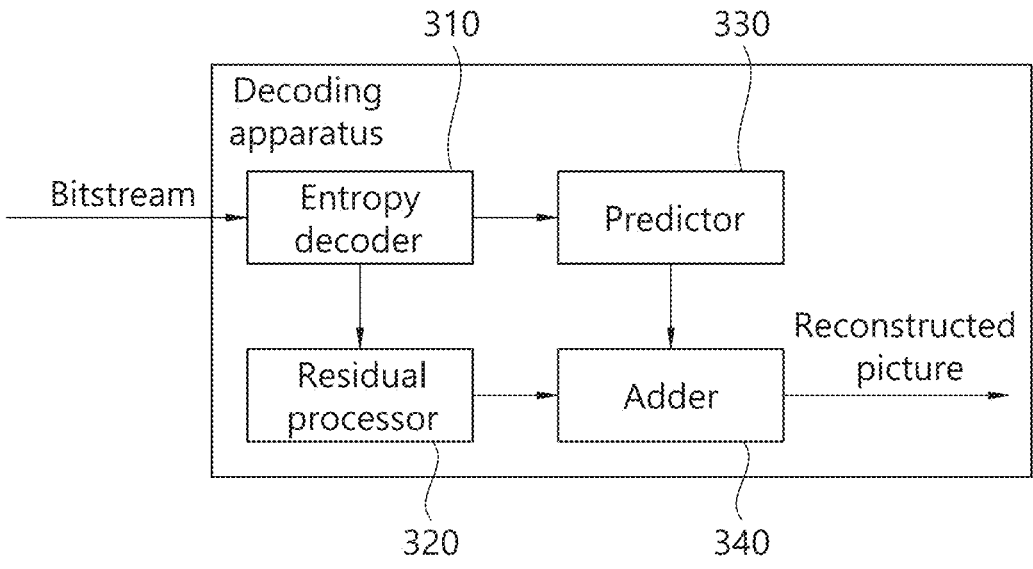
FIG. 11 schematically shows a decoding apparatus for performing an image decoding method according to this document.

FIG. 11 schematically shows a decoding apparatus for performing an image decoding method according to this document. The method disclosed in FIG. 10 may be performed by the decoding apparatus disclosed in FIG. 11. Specifically, for example, the entropy decoder of the decoding apparatus of FIG. 11 may perform S1000 of FIG. 10; the residual processor of the decoding apparatus of FIG. 11 may perform S1010 to S1020 of FIG. 10; and the adder of the decoding apparatus of FIG. 11 may perform S1030 of FIG. 10.

According to this document described above, even if the first transform block in the current chroma block does not include a non-zero transform coefficient level, and when at least one of the width and height of the current chroma block is greater than a specific size, information on the CU chroma QP offset can be signaled, and, thereby, it is possible to reduce the cost of configuring the decoding apparatus.

Further, according to this document, even if the first transform block in the current chroma block does not include a non-zero transform coefficient level, information about the CU chroma QP offset may be signaled in the transform unit syntax of the first transform block based on the size and tree type of the current chroma block, and, thereby, it is possible to reduce the buffer requirement of the decoding apparatus and to reduce the cost of configuring the decoding apparatus.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VOD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 12:
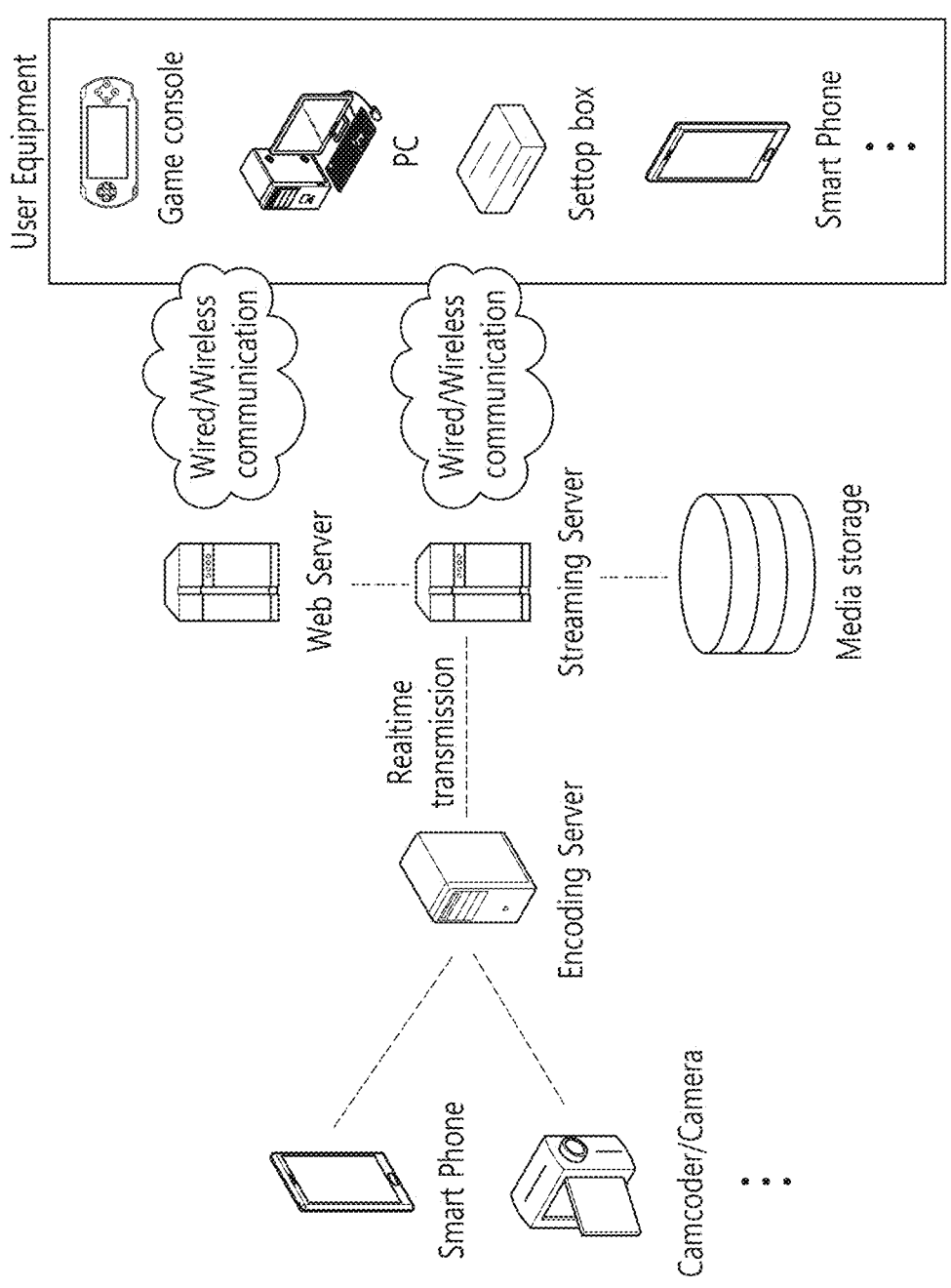
FIG. 12 illustrates a structural diagram of a contents streaming system to which the present disclosure is applied.

FIG. 12 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. An image decoding method, performed by a decoding apparatus, comprising:
obtaining Coding Unit (CU) chroma Quantization Parameter (QP) offset related information for a chroma component of a current coding unit based on a tree type and a size of the current coding unit;
deriving a chroma QP for the current coding unit based on the CU chroma QP offset related information;
deriving residual samples for the current coding unit based on the chroma QP; and
generating a reconstructed picture based on the residual samples,
wherein the CU chroma QP offset related information includes a CU chroma QP offset flag and a CU chroma QP offset index for the current coding unit,
wherein based on at least one of a width and a height of the current coding unit being greater than 64 and the tree type being not a dual tree luma, the CU chroma QP offset flag is obtained, and
wherein based on the CU chroma QP offset flag representing that an entry in a CU QP offset list is used to determine a value of a CU chroma QP offset, the CU chroma QP offset index is obtained.

2. An image encoding method, performed by an encoding apparatus, comprising:
generating Coding Unit (CU) chroma Quantization Parameter (QP) offset related information for a chroma component of a current coding unit based on a tree type and a size of the current coding unit; and
encoding image information including the CU chroma QP offset related information,
wherein the CU chroma QP offset related information includes a CU chroma QP offset flag and a CU chroma QP offset index for the current coding unit,
wherein based on at least one of a width and a height of the current coding unit being greater than 64 and the tree type being not a dual tree luma, the CU chroma QP offset flag is signaled, and
wherein based on the CU chroma QP offset flag representing that an entry in a CU QP offset list is used to determine a value of a CU chroma QP offset, the CU chroma QP offset index is signaled.

3. A method for data for image, the method comprising:

generating a bitstream of image information including Coding Unit (CU) chroma Quantization Parameter (QP) offset related information for a chroma component of a current coding unit; and transmitting the data including the bitstream of the image information including the CU chroma QP offset related information, wherein the CU chroma QP offset related information is generated based on a tree type and a size of the current coding unit, wherein the CU chroma QP offset related information includes a CU chroma QP offset flag and a CU chroma QP offset index for the current coding unit, wherein based on at least one of a width and a height of the current coding unit being greater than 64 and the tree type being not a dual tree luma, the CU chroma QP offset flag is signaled, and wherein based on the CU chroma QP offset flag representing that an entry in a CU QP offset list is used to determine a value of a CU chroma QP offset, the CU chroma QP offset index is signaled.

\* \* \* \* \*